United States Patent Office 2,828,275
Patented Mar. 25, 1958

2,828,275

MIXTURES OF FURFURAL-KETONE AND PARTIALLY HYDROGENATED FURFURAL-KETONE ORGANIC REACTION PRODUCTS

Mortimer T. Harvey, South Orange, N. J., assignor to Harvel Research Corporation, a corporation of New Jersey No Drawing. Application March 18, 1954
Serial No. 417,219

17 Claims. (Cl. 260—42)

This invention relates to novel compositions of matter and to methods for preparing them and also to novel products containing one or more of said novel compositions as components thereof and also to methods for producing them. In one of its specific aspects the invention is directed to novel compositions (I) which, when a 100-gram sample thereof is mixed with 20 grams of an alcoholic solution of paratoluene sulfonic acid containing equal parts by weight of alcohol and said acid, are capable of being heat converted at 300° F. to the substantially solid and infusible state within 24 hours and also to such compositions (I) converted to the substantially solid and infusible state.

Prior to this invention I prepared novel compositions of matter comprising intimate combinations of (A) furfural and (B) a material selected from the group consisting of partially hydrogenated furfural-ketone organic reaction products and such partially hydrogenated products which were thickened or polymerized under acid conditions. Such combinations are disclosed in my application Serial No. 323,951 filed December 3, 1952, now U. S. Patent No. 2,776,266 and have found use in a number of different arts. I have discovered that such combinations of (A) and (B) could be improved by combining therewith (C) a material selected from the group consisting of organic reaction products of furfural and a ketone and such furfural-ketone reaction products polymerized or thickened under acidic conditions. Such three-component intimate combinations of (A), (B) and (C) of this invention, when compared with the two-component combinations of (A) and (B) are characterized by being more stable and having a longer pot-life especially when the combinations are acidic, and are further characterized as being capable of being provided in the higher viscosities especially when the products (B) employed are not first thickened under acidic conditions; are still further characterized as being much less expensive so that they find greater and more extensive use; are further characterized as providing superior foamed acid cured resins; are further characterized as being more suitable for the addition of epon resins and especially such resins produced by reacting glycidyl ethers with carboxylic acids and especially di-basic carboxylic acids or the anhydrides thereof. I believe that the presence of the material (C) in such combinations of this invention acts as a "fluxing agent" when such epon resins are combined therewith.

According to one aspect of this invention, said novel compositions (I) have a viscosity no greater than 5000 centipoises at 25° C. and all comprise (A), (B) and (C) intimately combined with each other, with the ratio by weight of (B) to (C) being 500 parts of (B) to 50–5000 parts of (C) and with the ratio by weight of (A) to the sum of the quantities of (B) and (C) being 100 parts of (A) to 100–500 parts of the sum of the weights of (B) and (C) depending upon the viscosity of the particular products (B) and (C) employed, the ratio of (B) to (C), the specific viscosity and other characteristics of the composition (I) desired.

Said organic reaction products (C) are all liquid at 220° F. and may be produced by reacting furfural with one or a combination of two or more ketones having at least two hydrogen atoms on an alpha carbon. Examples of specific ketones which may be employed and the method for producing furfural-ketone reaction products under alkaline conditions are well known to the art as set forth in the U. S. Patent to S. Caplan and M. T. Harvey 2,363,829 of November 12, 1949, and to M. T. Harvey 2,461,510 of February 15, 1949. All of said specific organic reaction products of said patents and produced by reacting furfural and a ketone under alkaline conditions are examples of products (C) which are used in the practice of this invention. Said products (C) may also be such organic reaction products which have subsequently been polymerized under acidic conditions to liquid or fusible state and being liquid at 220° F. and the method for so polymerizing them is also well known to the art as set forth in the patent to M. T. Harvey 2,461,510.

Said organic reaction products (B) are all liquid at 220° F. and are partially hydrogenated furfural-ketone organic reaction products and also other products produced by thickening or polymerizing said partially hydrogenated furfural-ketone organic reaction products under acidic conditions. Specific examples and methods for producing these various products (B) are disclosed in my U. S. Patents 2,600,403 and 2,600,764 both issued January 17, 1952 which are made part hereof. Examples of the products (B) are (a) partially hydrogenated monofurfuryl-ketone; (b) partially hydrogenated difurfuryl-ketone; (c) partially hydrogenated organic reaction masses, said organic reaction masses before hydrogenation having a viscosity of at least 50 cps. at 25° C. and produced by reacting under alkaline conditions furfural and a ketone having two hydrogen atoms on an alpha carbon; (d) partially hydrogenated residual fractions of said reaction masses, said fractions obtained by heat distillation of said reaction masses and measuring by weight at least 60% of said reaction masses; (e) residual fractions obtained by heat distillation of (c) and measuring at least 60% by weight of (c); (f) thickened or polymerized products produced by thickening or polymerizing (a), (b), (c), (d), and/or (e) under acidic conditions; (g) and combinations of two or more of the materials (a)–(f). Examples (a) and (b) of products (B) are produced by hydrogenating or combining with hydrogen respectively monofurfuryl-ketone and difurfuryl-ketone to an extent of at least approximately 15% and no more than approximately 65% of that necessary to completely saturate with hydrogen the carbon to carbon double bonds thereof. In like manner, examples (c) and (d) of products (B) are respectively produced by hydrogenating or combining with hydrogen said unhydrogenated furfural-ketone organic reaction masses and said residual fractions of said reaction masses to an extent at least approximately 15% and no more than 65% of that necessary to completely saturate with hydrogen the carbon to carbon double bonds thereof.

If desired, said composition (I) may also include (D) one or a combination of two or more of the following, all liquid at 220° F., furfuryl alcohol; acid condensation polymerization organic products of furfuryl alcohol in the liquid or fusible state, and liquid at 220° F., examples of which are disclosed in the U. S. Patent to M. T. Harvey 2,342,973 of March 14, 1944; furfuryl alcohol-formaldehyde reaction products in the liquid or fusible state and liquid at 220° F. produced by following the method set forth in the U. S. Patent to M. T.

Harvey 2,343,972 of March 14, 1944; organic reaction products in their liquid or fusible state and liquid at 220° F. produced by reacting formaldehyde with condensation polymerization products of furfuryl alcohol disclosed in the U. S. Patent to M. T. Harvey 2,343,973; and liquid or fusible organic reaction products and liquid at 220° F. produced by reacting under acidic conditions formaldehyde with furfural-ketone organic reaction products produced under alkaline conditions disclosed in the U. S. Patent to M. T. Harvey 2,363,829. By the term "formaldehyde" I mean formaldehyde as well as its polymers such as paraformaldehyde, etc. When (D) is employed, I prefer that composition (I) should have a viscosity no greater than 5000 cps. at 25° C. with the quantity of (D) employed being such that there is present 0-100 parts of (D) and preferably 5-100 parts of (D) to each 100 parts of the sum of the weights of (B) and (C).

Said novel compositions (I) offer a wide variety of unique and inexpensive compositions of matter which find employment in a number of different fields. All of them may be converted to the substantially solid and infusible state under comparatively low pH conditions and may be employed as impregnants for wood, carbon, sawdust, paper and other materials, as casting compositions, electrical insulating compositions, coating compositions for floorings, table tops, to surface wood, metal, etc., to provide protective coating, as cold setting cements which may be employed as adhesives for tile, and other floor coverings, as material for pipes and conduits, as coatings for pipes, conduits, tanks, etc., as joint material for pipes and the like, as tiles, etc. When used for the aforesaid purposes, they are generally loaded with filler carrying an acidic agent to impart the desired pH to the mass for curing. They may be used as impregnants and/or adhesives for the lamination of a wide variety of products such as glass fabric, glass matting, paper, wood, etc., and also may be used in the production of wound tubings of said materials. They may also be used as components in friction elements such as brake linings, clutch facings, etc. In the friction element field they may find application as binders for the asbestos fibers and other components thereof and/or they may be used in providing friction fortifier dusts therefor. They may also be used in combination with rubber materials. They may be combined with (E) rubbery materials such as reclaimed rubber, natural rubber, normally solid or rubbery copolymers of butadiene and styrene, normally solid or rubbery polymers of chloroprene, normally solid or rubbery polymers of butadiene, and normally solid or rubbery copolymers of butadiene and acrylonitrile. The ratio by weight of composition (I) to the material (E) may be 1-100 parts of composition (I) to 100-1 parts of material (E).

Also according to another specific aspect of this invention, one or more of the products (C) and one or more of the products (D), in the before mentioned proportions are preferably first heated together to drive off residual water which is not readily removable from products (B) and to cause a more intimate combination of the components and possible reaction of components. The heating is generally carried out at temperatures of up to 250° F. and at pressures of 1" of mercury and is continued until the moisture content of the composition is no greater than 0.5% of the weight of the composition (I), then the furfural is added thereto to provide a mass, generally solution, which has a viscosity of no greater than 5000 cps. at 25° C. Such substantially completely dehydrated compositions (I) find particular application for use and in the fields heretofore set forth.

The following Examples 1-14 are given merely to further illustrate some of the methods for providing some of the materials (C) employed in the practice of this invention and are not to be construed in a limiting sense, all parts being given by weight in these and all other examples of this application unless otherwise specified.

*Example 1*

Into a 1-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical mixer or agitator which may be in the nature of a paddle mixer. This mixture is agitated and while in the state of agitation there is added thereto about ⅙ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about 3 or 4 minutes. After about 10 minutes there is added to the mass in said autoclave another charge consisting of 40 lbs. of furfuraldehyde and 24 lbs. acetone. Then to the mass in the autoclave there is added a second increment of said sodium hydroxide solution equal in volume to the first addition. After a few minutes the temperature of the mass will, due to the exothermic reaction, rise to approximately 165-170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180-195° F. Then the mass within the autoclave may be heated by means of a steam coil located therein and through a jacket carried thereby to maintain the temperature of the mass between approximately 185-190° F. for about 30 minutes in order to complete the reaction and to obtain high yields. The steam is cut off from the coil and jacket and then there is added thereto an aqueous solution of sulfuric acid in quantities sufficient to render the mass practically neutral. In this instance there may be added an aqueous solution of sulfuric acid consisting of 3 lbs. 3 oz. of concentrated sulfuric acid diluted in 6 lbs. 6 oz. of water. Then this mass may be heated for about 5 minutes at a temperature between 175-200° F. to substantially completely neutralize the mass. The substantially neutral mass may then be substantially completely dehydrated by heating the same to a temperature at 220° F. with or without vacuum, yielding approximately 300 lbs. of dehydrated substantially neutral material known as product C-1 whose viscosity at 25° F. is 92 cps., and having a specific gravity at 25° C. of 1.150.

*Example 2*

200 grams of mesityl oxide, 195 grams of furfural and 4 grams of sodium hydroxide in 8 cc. of water were mixed together whereupon an exothermic reaction ensues and is allowed to proceed. After it terminates, the mass is refluxed at 200-230° F. for a period of approximately 1 hour. The mass is dehydrated at 160° C. whereupon 300 grams of oily furfural-mesityl oxide reaction product is obtained, has a viscosity of about 100 centipoises at 25° C. and is hereinafter known as product C-2.

Employing the process set forth in Example 2 but using the materials set forth in the quantities stated in the respectively numbered Examples 3-13, there are obtained particular furfural-ketone reaction products C-3 to C-13 respectively.

*Example 3*

96 grams of furfural
72 grams of methyl ethyl ketone
4.4 cc. 33% solution of NaOH in water were used to produce product C-3

Example 4

100 grams furfural
100 grams methyl isobutyl ketone
1 gram NaOH in 2 grams of water were used to produce product C-4

Example 5

200 grams furfural
232 grams diacetone alcohol, and
1 gram NaOH in 1 gram water were used to produce product C-5

Example 6

100 grams furfural
138 grams isophorone, and
5 grams NaOH in 10 grams of water were used to produce product C-6

Example 7

96 grams of furfural
138 grams of phorone, and
1 gram NaOH in 2 grams of water were used to produce product C-7

Example 8

96 grams of furfural
98 grams of cyclohexanone, and
1 gram NaOH in 2 grams of water were used to produce product C-8

Example 9

96 grams of furfural
120 grams of acetophenone, and
1 gram of NaOH in 2 grams of water were used to produce product C-9

Example 10

96 grams of furfural
114 grams of methyl n-amyl ketone, and
1 gram of NaOH in 2 grams of water were used to produce product C-10

Example 11

96 grams of furfural
14 grams acetonyl acetone, and
1 gram of NaOH in 2 grams of water were used to produce product C-11

Example 12

96 grams of furfural
86 grams diethyl ketone, and
1 gram of NaOH in 2 grams of water were used to produce product C-12

Example 13

96 grams of furfural
140 grams diisobutyl ketone, and
20 grams of NaOH in 40 grams of water were used to produce product C-13.

Example 14

Said reaction products C-1 to C-13 either alone or in combination of two or more of them may be thickened under acidic conditions in the manner now known to the art to increase the viscosity thereof at 25° C. to a value at least twice that of the respective products C-1 to C-13 but to a value such that when combined with one or a combination of two or more of products (B) and with furfural in the proportions heretofore set forth will provide a solution no greater than 200 cps. at 25° C. Such thickened products of C-1 to C-13 are respectively known as C-14 to C-26 and when thickened under acidic conditions have a viscosity of at least about 200 centipoises at 25° C. and the degree of thickening of C-1 to C-13 is controlled depending upon the specific amounts of (A) and (B) between the limits heretofore set forth is to be employed and the viscosity of composition (I) desired, but with the viscosity of (I) being no greater than 5000 centipoises at 25° C.

The general method for thickening said products C-1 to C-13 is described in the patent to M. T. Harvey 2,461,510 and in general consists of adding an acidic agent thereto to reduce the pH thereof to a value 0.35-3. For the purposes of this invention, an acidic agent is employed in such amount that the pH of the mass is about 1.5. Then the so pH-modified mass is heated externally until the mass has thickened to the desired viscosity. At this state the mass is immediately and rapidly cooled to room temperature and if desired an alkaline material such as sodium hydroxide, potassium hydroxide or lime may be added during the cooling step to aid in stopping the thickening.

Examples of some of products (B) are: the furfural-ketone reaction masses of Examples 1-13, as well as the monofurfuryl-ketone and the difurfuryl-ketone fractions thereof, and the residual fractions thereof produced by heat distilling said respective masses to provide residues measuring at least 60% by weight of said masses which have been individually partially hydrogenated by following the method set forth in my U. S. Patents 2,600,403 and 2,600,764 to provide a number of specific furfural-ketone reaction products having had hydrogen combined therewith to an extent of at least approximately 15% and not more than approximately 65% of that necessary to completely saturate with hydrogen the carbon to carbon double bonds thereof; also said partially hydrogenated reaction masses, monofurfuryl-ketones, difurfuryl-ketones and residues respectively polymerized or thickened under acidic conditions at pH of .3-4 and preferably 2.5 to increase their viscosities at least 100% at 25° C., also the residues obtained by heat distilling said respective partially hydrogenated reaction masses to provide a residue measuring at least 60% by weight of said partially hydrogenated reaction masses and said last mentioned residues thickened under the aforesaid acidic conditions to increase their viscosities at least 100% at 25° C., and all of said products (B) employed in the practice of this invention are liquid at 220° F.

Example 15

500 parts of one or a combination of two or more of said products (B), 100-2500 parts of one or a combination of two or more of said products (C) and 0-100 parts of (D) for each 100 parts of the sum of the parts of (B) and (C) are charged into a container to provide a uniform mixture or solution. Before adding said components to each other, their pHs may be adjusted when required to approximately 7. In any case the mass is heated under reduced pressure conditions of about 1 mm. of mercury pressure and up to a temperature in the range of 150-300° F. to remove any residual water and so that the moisture content of the mass is no greater than 0.5% of the weight thereof. Then to said substantially completely dehydrated mass, hereinafter known as composition M, and being still another aspect of this invention have 100 parts of (A) added thereto for each 100-500 parts of the sum of the weights of (B) and (C) employed. This mass is also mixed to uniformity or solution and like before heated under said reduced pressure conditions to provide composition (I) having a moisture content below 0.5% by weight. In this last heating step, some furfural as well as water may come off and they are collected, and the furfural distilled off is replaced.

Example 16

For certain purposes, I prefer to prepare composition (I) as follows, and I employ the components in the proportions heretofore set forth: Components (A), (B) and (C) with or without component (D) in the proportions hereinbefore set forth are charged into a container and are heated together to a temperature of about 300° F. and then while under reduced pressure of approximately 1 mm. of mercury pressure the mass is maintained for about twenty minutes in the range of 150–300° F. While the mass is at such elevated temperatures, water comes off as does some furfural which is collected. The furfural which comes off is replaced and the mass will be found to have a water content of less than 0.5% of the weight thereof and the viscosity of the mass is no greater than 5000 centipoises at 25° C. and in some cases is lower than 100 centipoises at 25° C. because there is only a small change in viscosity due to the heating.

The procedure set forth in Example 15 or Example 16 and preferably that of the latter is employed in Examples 17 to 28 with the particular components and proportions set forth in said Examples 17 to 28 as hereinafter indicated to provide respective compositions (I) hereinafter identified therein; and all having viscosities no greater than 5000 centipoises at 25° C. and containing less than 0.5% by weight of water, if any.

*Example 17*

120 parts of product C-1
30 parts of product HA of my Patent 2,600,403 and being partially hydrogenated furfural-acetone organic reaction mass
60 parts of furfural
Resultant composition: P-1

*Example 18*

100 parts of product C-2
50 parts of product HA-1 of my Patent 2,600,403 and being essentially partially hydrogenated monofurfurylacetone
75 parts of furfural
Resultant composition: P-2

*Example 19*

100 parts of products C-1
20 parts of residual fraction obtained in Example 1A of my Patent 2,600,403 by heat distilling HA and taking off a distillate consisting essentially of HA-1 measuring 32% by weight of HA
120 parts of furfural
Resultant composition: P-3

*Example 20*

200 parts of product C-3 (viscosity approximately 200 cps. (at 25° C.)
300 parts of product HA-2 of my Patent 2,600,403 and consisting essentially of partially hydrogenated difurfuryl-ketone
200 parts of furfural
Resultant composition: P-4

*Example 21*

60 parts of product C-11 (viscosity approximately 30,000 cps. at 25° C.)
500 parts of product HB of my Patent 2,600,403 and being partially hydrogenated methyl ethyl ketone-furfural organic reaction product
400 parts of furfural
Resultant composition: P-5

*Example 22*

100 parts of product C-4 (viscosity approximately 200 cps. at 25° C.)
200 parts of product HE of my Patent 2,600,403 and being partially hydrogenated furfural-acetone organic reaction product
100 parts of furfural
Resultant composition: P-6

*Example 23*

200 parts of product C-1
20 parts of product HA identified in Example 17 herein
100 parts of furfural
Resultant composition: P-7

*Example 24*

100 parts of product C-1 polymerized or thickened under acidic conditions to a viscosity of 300 centipoises at 25° C.
500 parts of product HA identified in Example 17 herein
300 parts of furfural
Resultant composition: P-8

*Example 25*

100 parts of product C-1
50 parts of product HA identified in Example 17 herein but polymerized or thickened under acidic conditions to a viscosity of approximately 300 centipoises at 25° C.
100 parts of furfural
Resultant composition: P-9

*Example 26*

200 parts of product C-1 polymerized or thickened under acidic conditions to a viscosity of approximately 300 centipoises at 25° C.
100 parts of product HA identified in Example 17 herein and polymerized or thickened under acidic conditions to a viscosity of approximately 200 centipoises at 25° C.
250 parts of furfural
Resultant composition: P-10

*Example 27*

100 parts of product C-15 (viscosity approximately 500 cps. at 25° C.)
300 parts of HA hereinbefore identified in Example 17
80 parts of furfural
Resultant composition: P-11

*Example 28*

100 parts of product C-18 (viscosity approximately 1000 cps. at 25° C.)
100 parts of product HA-2 identified in Example 20 herein but being thickened or polymerized under acidic conditions to a viscosity of approximately 500 centipoises at 25° C.
200 parts of furfural
Resultant composition: P-12

In another aspect of this invention compositions (M) are made up from (B) and (C), with or without (D), in the proportions heretofore set forth and they like compositions (I) find utility in the same fields as compositions (I), but are more suitable in some of them than in others. Specific examples of said compositions (M) are compositions M-1 to M-12 which are the same as the hereinbefore set forth Examples 17–28 except that the furfural of each of said Examples 17–28 is omitted entirely.

All of said specific compositions, specifically set forth in Examples 17–28 and known respectively as compositions P-1 to P-12 as well as any other consisting of products (A), (B) and (C) in the proportions heretofore set forth, may, if desired, also include one or a combination of two or more of the products (D) hereinbefore particularly defined and in the proportions set forth and are preferably so chosen for one of the aspects of this invention, that the viscosity of the resultant composition shall be no greater than 5000 cps. at 25° C. The following are specific examples thereof given merely by way of illustration. In all cases the resultant compositions P-13 to P-21 will have a viscosity no greater than 5000 cps. at 25° C. and a moisture content, if any, of no greater than 0.5%. The preferable method for producing said composition is that set forth in Example 16. The ratio of the components are herein set forth in the specific examples and the resultant compositions identified.

*Example 29*

100 parts of product C-1
40 parts of product HA (identified in Example 17)
80 parts furfural
40 parts furfuryl alcohol
Resultant composition: P-13

Example 30

40 parts of product C-3 (viscosity approximately 100 cps. at 25° C.)
10 parts of furfuryl alcohol-formaldehyde reaction product (viscosity approx. 10,000 cps.)
100 parts of product HA (identified in Example 17)
50 parts of furfural
Resultant composition: P-14

Example 31

100 parts of product C-3 (viscosity approximately 100 cps. at 25° C.)
50 parts residual fraction identified in Example 19
100 parts acid condensation polymerization organic product of furfuryl alcohol described in Example B of Patent 2,343,973 (viscosity approximately 50 cps. at 25° C.)
100 parts furfural
Resultant composition: P-15

Example 32

100 parts of product C-1
10 parts of thick, tacky resinous product produced by reacting acid condensation polymerization organic product of Example 31 herein reacted with formaldehyde as disclosed in Example 5 of Patent No. 2,343,973
100 parts of product HA-1 (identified herein in Example 18)
200 parts of furfural
Resultant composition: P-16

Example 33

100 parts of product C-2
200 parts of HA-2 (identified herein in Example 20)
20 parts of furfuryl alcohol-paraformaldehyde liquid organic reaction product identified in Example 10 of Patent 2,343,973
300 parts of furfural
Resultant composition: P-17

Example 34

100 parts of product C-1
10 parts of furfural-ketone-formaldehyde viscous resin disclosed in Example 3 of Patent 2,363,829
500 parts of product HB (identified herein in Example 21)
300 parts of furfural
Resultant composition: P-18

Example 35

100 parts of product C-4 (viscosity approximately 200 cps. at 25° C.)
200 parts of product HE (identified in Example 22 herein)
20 parts of furfuryl alcohol
20 parts of acid condensation polymerization product (identified in Example 31 herein)
100 parts of furfural
Resultant composition: P-19

Example 36

100 parts of polymerization or thickened product C-1 (identified in Example 24 herein)
500 parts of product HA (identified in Example 17 herein)
20 parts of acid condensation polymerization product of furfuryl alcohol (identified in Example 31 herein)
500 parts of furfural
Resultant composition: P-20

Example 37

200 parts of polymerized or thickened product C-1 (identified in Example 26 herein)
50 parts of polymerization or thickened product HA (identified herein in Example 25)
5 parts of furfuryl alcohol-formaldehyde reaction product (identified in Example 30 herein)
5 parts of furfural-ketone-formaldehyde reaction product (identified in Example 34 herein)
200 parts of furfural
Resultant composition: P-21

Example 38

Additional specific examples of said compositions (M) are compositions M-13 to M-21 which are the same as the respective Examples 29-37 herein except that all of the furfural has been omitted.

All of said novel compositions (I) and (M), examples of which are the resultant compositions P-1 to P-21 and M-1 to M-21, are characterized as having a viscosity no greater than 5000 centipoises at 25° C., a moisture content, if any, below about 0.5% by weight of the mass, and when a 100 gram sample thereof is mixed with a 20 gram solution of equal parts by weight of paratoluene sulfonic acid and alcohol such mixture is capable of being heat converted to the substantially solid and infusible state when maintained at 300° F. for 24 hours. Said compositions (I) and (M) are readily pourable liquids which are homogeneous and in general for all practical purposes may be termed solutions.

These compositions (I) and (M) may be converted to the substantially solid and infusible state by employing a cationic catalyst in the desired proportions dependent upon the speed of reaction required, and whether or not external heat is to be applied and the degree and extent thereof. Examples of some of such catalysts are paratoluene sulfonic acid, diethyl sulphate, sulfuric acid, hydrochloric acid, hydrobromic acid, boron trifluoride, mono-, butyl- and propyl-phosphate, phenol sulphonic acid, xylenol sulfonic acid, fluoroboric acid, cresol sulphonic acid, naphtol sulfonic acid, etc. For most purposes, the quantity of catalyst employed with compositions (I) or (M) is such that the pH of the resultant mass is no greater than approximately 3.5, and in some cases where cold setting is required may be as low as 0.5 or less, dependent on the desired speed of cure, temperature employed in curing and the particular individual components of compositions (I) or (M). The method for measuring the pH may be that described in U. S. Patent 2,600,403.

Any of said compositions (I) and (M) may be used in the arts heretofore set forth. The following Examples 39–40 are given merely by way of illustrating their use in the field of friction elements, such as brake linings and clutch facings.

Example 39

A length of woven or pressed, felted or matted asbestos of the desired dimensions and of the type commonly employed in the production of brake linings is first deaerated and dehydrated and then is soaked in a bath consisting of 100 parts by weight of composition P-1 or M-1, for example, and 10 parts by weight of diethyl sulphate free of acid to coat and impregnate the fibers thereof. Then after about three hours of soaking, the excess P-1 or M-1 is removed and the coated-impregnated asbestos is allowed to drain overnight. Then it is cut into the desired lengths, placed around a form, and under pressure heated to 150° F. and then gradually from 150° F. to 450° F. over a 24-hour period. Then it is removed from the oven, allowed to cool to room temperature. The P-1 or M-1 therein will be found to have been cured to the dry, substantially solid and infusible state having good frictional properties.

Example 40

Instead of employing said compositions (I) or (M) as binders and frictional materials with asbestos for brake linings, said materials may be prepared in the form of comminuted materials and then incorporated in a binder for said asbestos and are retained in said binder as discrete particles. The binder employed may be any of those known to the art such as rubber, phenol-aldehyde resins, heat polymerized drying oils and the like or combinations of these or other materials heretofore used for this purpose.

A quantity of one of said compositions P–1 or M–1 together with 5% of toluene sulphonic acid is poured into shallow pans and cured for 24 hours at about 300–400° F. After that period, it will have been converted to the substantially dry, solid and infusible state. This dry mass is then comminuted in any convenient manner by using, for example, differential rolls on a hammer mill. The mass is comminuted so that there is provided a relatively fine dust whose particle size is below about 20 mesh per square inch. This friction augmenting dust may be combined with the asbestos and binder therefor in the manner heretofore employed for the incorporation of dusts as components of brake linings. The usual manner is to incorporate in a brake lining of asbestos fibers, 8–20% of dust based on the weight of the finished product, about double that amount of a binder, together with barytes, carbon black and other materials which may be used therewith.

One of the best uses for these various compositions (I) is in the fields of protective coverings, floorings and cold seting cements. Compositions (M) may also be used in these fields but compositions (I) appear to be better suited for those purposes because they are less expensive and in some cases are of very low viscosity which some purchasers require. In such fields compositions (I) are combined with a filler, which may be in the nature of fine particles or dusts and preferably those which may be impregnated or otherwise will carry the catalyst employed. Of course other fillers may be employed depending upon the characteristics required, cost and other factors. Examples of some others are finely comminuted powdered sand, silicon dioxide, aluminum oxide, barium sulphate, calcium sulphate, titanium dioxide, silicon carbide, slate dust, etc. The ratio by weight of filler to composition (I) or (M) in general is 600 parts of filler to 100–3600 parts of composition (I) or (M).

The following Examples 41–44 are given by way of illustrating novel cold setting cements of this invention, all parts being given by weight unless otherwise specified.

*Example 41*

Into a container is charged 100 pounds of composition P–1 or M–1. Into a second container is uniformly mixed 200 pounds of finely divided calcined petroleum carbon (finer than 100 mesh) and 6 lbs. of paratoluene sulfonic acid to provide a substantially dry acidic catalyzed carbon, containing the acid catalyst substantially uniformly distributed throughout the carbon. Then the entire mass of said acid catalyzed carbon is charged into the composition P–1 or M–1 and the mixture is stirred until it is substantially uniform throughout. This cold mix may be spread, troweled or in any other manner worked and spread on a surface to be coated. It may be spread on a floor base and is allowed to set at room temperature (70° F.) for 24–48 hours after which it will be found to be a tough, wear resistant coating having good chemical resistance. When applied as a floor covering or coating material, it may be of any desired thickness from ⅟₁₆ inch to ½ inch or more, depending upon what is desired. It may be used in like manner to coat either the interior or exterior of tank walls, the top or bottom of table tops and the like. It may be used either alone or in combination with other fillers such as asbestos etc. for the manufacture of cold setting tile, brick, tubing, conduits and the like and may be used as a cement for cementing tile, brick, pipe joints, etc.

*Example 42*

100 parts of composition P–5 or M–5 of Example 15 are charged into a container. Then there is added to said mixture 100 parts of acid catalyzed finely divided carbon containing 8 parts of paratoluene sulfonic acid and produced in the same manner as that set forth in Example 35. The mass is agitated to provide a substantially uniform admixture of the components resulting in a mixture which may be spread or in other manner worked or spread onto a surface to be coated. The same procedure set forth in Example 41 may be followed to provide a tough, wear resistant coating having good chemical resistance.

*Example 43*

Following the same procedure as that set forth in Example 42, there are employed approximately 100 parts of the respective compositions P–1 to P–21 and M–1 to M–21 for each 175 parts of acid catalyzed carbon black prepared in the manner set forth in Example 41 and containing approximately 3–30 and generally about 8 parts of paratoluene sulfonic acid. These respective mixtures are treated in the same manner as that set forth in Example 41 to provide cold setting cements which are applied and cured in the manner set forth in Example 41 to provide tough, wear resistant and chemical resistant coatings.

All of these various cold setting cements described in Examples 41–43 are particularly suitable for the uses heretofore indicated and especially those for coating of table tops, flooring and as binders for brick, tile etc., and for linings of tanks and other places where either good wear resistance or chemical resistance is desired. Of course it is to be understood that the type as well as the amount of filler may be varied and that the proportion of catalyst as well as the particular catalyst may be changed depending upon the speed of setting which may be required. However, it is also to be understood that in one of its more specific aspects the invention is particularly directed to the employment of finely divided carbon black as a filler together with an acidic agent to be combined with one or more of said compositions (I) or (M) for the provision of unique, useful and highly novel cold setting cements.

*Example 44*

100 parts of composition P–14 or M–14 is charged into a mixer. Then 50 parts of carbon filler and being acid catalyzed in the manner set forth in Example 41 and having coupled therewith 5 parts of paratoluene sulfonic acid is charged into said mixer. The mass is then mixed to uniformity and then may be employed as a casting composition by charging it into molds and allowing to remain therein at room temperature for 96 hours and at the end of that period will be found to be dense, substantially solid and infusible resin. By employing this method and employing the desired compositions (I) or (M), filler and catalyst in the amounts dictated by the speed of cure required, whether or not heat is to be applied and the characteristics of the ultimate product, there may be cast tough, acid proof parts for pumps, housings, gears, pipes, chemical resistant vessels, table tops, and also molded parts for automobiles, airplanes, etc.

The general procedure of Example 44 or any other method may be employed in the manufacture of grinding wheels, and for such purpose silicon carbide, aluminum oxide or other abrasive in the desired particle size and such particles are bound together with any of said compositions (I) or (M) converted to the solid and infusible state.

When compositions (I) or (M) are to be employed as cold setting cements to be employed as components for bonding together tile, etc. in flooring or the like, it is preferable that said compositions (I) or (M) have a viscosity at 25° C. no greater than 500 centipoises and for best results in that field no greater than 200 centipoises. However, when used in the field of casting compositions, compositions (I) or (M) of greater viscosities and up to 5000 centipoises are generally to be employed.

It is also within the purview of this invention to employ said compositions (I) and (M) in the production of expanded solids in the form of a cellular structure or foam. It has been discovered that said composition (I) may be mixed with a foaming or blowing agent and one or more of said catalysts and such combinations without the application of external heat or pressure will be converted in a short period of time into an expanded resin in the solid and foamy or cellular state and having a volume at least 100 times that of the original combination. Such combinations serve admirably as foam-in-place compositions because the resultant foam or cellular composition will assume the shape of the cavity in which it was produced and will fill it completely. The foaming or blowing agents which I prefer to employ are those which will not release any appreciable amount of gas or vapor until the temperature of the mass has been materially increased. Due to the presence of the acidic agent, an exothermic reaction takes place and in the course of this reaction gas or vapor is liberated from the blowing or foaming agent due to its temperature having been raised to such gas or foam liberating stage. In addition any water which may have been added to composition (I) is converted to steam which also contributes to the expansion of the resin. The following is an example of such a combination, all parts given by weight unless otherwise specified.

*Example 45*

100 parts of composition P-1 or M-1, 50 parts of furfural and 15 parts of a blowing or foaming agent capable of liberating nitrogen at elevated temperature and purchasable on the open market as "Du Pont BL-353 Chemical Blowing Agent" consisting of 70% $N,N^1$-dimethyl-$N,N^1$-dinitroso terephthalamide and 30% mineral oil and this agent is capable of releasing 130-135 milliliters of nitrogen per gram of nitrogen releasing compound therein, were mixed together to homogeneity. Then to said mass was added 15 parts of an aqueous solution of fluoroboric acid (45% concentration) and quickly stirred therein and immediately poured into a cavity to be filled. In a very short period of time an exothermic reaction ensues converting said combination to a solid cellular or foamy mass completely filling the cavity.

It is to be understood that the following claims are intended to cover all the generic and specific features of the invention herein described and all statements of the scope of the invention which as a matter of language might be said to fall therebetween; and that they are intended to be inclusive in scope and not exclusive in that, if desired, other materials may be added to the compositions herein claimed without departing from the spirit of the invention. Particularly it is to be understood that in said claims, ingredients or components recited in the singular are intended to include compatible mixtures of said ingredients wherever the sense permits.

I claim:

1. A novel composition of matter comprising an intimate combination of (C) a material liquid at 220° F. and selected from the group consisting of (a) organic reaction products produced by reacting furfural and a ketone having at least two hydrogen atoms on an alpha carbon, (b) homopolymerized organic reaction products (a), and (c) mixtures of at least one of said organic reaction products (a) and one of said products (b), and (B) a material liquid at 220° F. and selected from the group consisting of (d) partially hydrogenated monofurfuryl-ketone, (e) partially hydrogenated difurfuryl-ketone, (f) partially hydrogenated organic reaction masses, said organic reaction masses before hydrogenation produced by reacting furfural and a ketone having at least two hydrogen atoms on an alpha carbon, (g) partially hydrogenated residual fractions of said reaction masses, said residual fractions before hydrogenation obtained by the heat distillation of said reaction masses and measuring by weight at least 60% of said reaction masses, (h) residual fractions obtained by the heat distillation of (f) and measuring at least 60% by weight of (f), (i) polymerized products produced by homopolymerizing respectively (d), (e), (f), (g) and (h) and combinations of at least two of them, said (d) and (e) being respectively monofurfuryl-ketone and difurfuryl-ketone which have had hydrogen combined therewith to an extent at least approximately 15% and no greater than approximately 65% of that necessary to completely saturate with hydrogen all of the carbon to carbon double bonds thereof, said (f) and (g) being respectively said furfural-ketone organic reaction masses and said residual fractions thereof which have had hydrogen combined therewith to an extent at least approximately 15% and no greater than approximately 65% of that necessary to completely saturate with hydrogen all of the carbon to carbon double bonds thereof, the ratio by weight of (B) to (C) being 500 parts of (B) to 50-5000 parts of (C).

2. A novel composition of matter comprising a composition defined in claim 1 converted under acidic conditions to the substantially solid state.

3. A novel composition comprising a novel composition defined in claim 1 together with a filler and an acidic agent in amount sufficient to impart a pH no greater than 3.5 thereto.

4. A novel composition of matter comprising an intimate combination of a novel composition defined in claim 1 together with (A) furfural, the ratio by weight of (A) to the sum of the combined weights of (B) and (C) being 100 parts of (A) to 100-500 parts of the sum of the weights of (B) and (C), and (D) a material liquid at 220° F. and selected from the group consisting of (j) furfuryl alcohol, (k) organic acid condensation polymerization products of (j), (l) furfuryl alcohol-formaldehyde organic reaction products, (m) organic reaction products of (k) and formaldehyde, (n) organic reaction products of formaldehyde and furfural-ketone reaction products.

5. A novel composition of matter comprising a composition defined in claim 4 converted under acidic conditions to the substantially solid state.

6. A novel composition of matter comprising an intimate combination of (C) a material liquid at 220° F. and selected from the group consisting of (a) organic reaction products produced by reacting furfural and a ketone having at least two hydrogen atoms on an alpha carbon, (b) homopolymerized organic reaction products (a), and (c) mixtures of at least one of said organic reaction products (a) and one of said products (b), and (B) a material liquid at 220° F. and selected from the group consisting of (d) partially hydrogenated monofurfuryl-ketone, (e) partially hydrogenated difurfuryl-ketone, (f) partially hydrogenated organic reaction masses, said organic reaction masses before hydrogenation produced by reacting furfural and a ketone having at least two hydrogen atoms on an alpha carbon, (g) partially hydrogenated residual fractions of said reaction masses, said residual fractions before hydrogenation obtained by the heat distillation of said reaction masses and measuring by weight at least 60% of said reaction masses, (h) residual fractions obtained by the heat distillation of (f) and measuring at least 60% by weight of (f), (i) polymerized products produced by homopolymerizing respectively (d), (e), (f), (g) and (h) and combinations of at least two of them, said (d) and (e) being respectively monofurfuryl-ketone and difurfuryl-ketone which have had hydrogen combined therewith to an extent at least approximately 15% and no greater than approximately 65% of that necessary to completely saturate with hydrogen the carbon to carbon double bonds thereof, said (f) and (g) being respectively said furfural-ketone organic reaction masses and said residual fractions thereof which have had hydrogen combined therewith to an extent at least approximately 65% of that necessary to completely saturate with hydrogen all of the carbon to carbon double bonds thereof and (D) a material liquid at 220° F. and selected from the group consisting of (j) furfuryl alcohol, (k) organic acid condensation polymerization products of (j), (l) furfuryl alcohol-formaldehyde organic reaction products, (m) organic reaction products of (k) and formaldehyde, (n) organic reaction products of formaldehyde and furfural-ketone reaction products, the ratio by weight of (B) to (C) being 500 parts of (B) to 50–5000 parts of (C) and the ratio by weight of (D) to the combined weights of (B) and (C) being 5–100 parts of (D) to 100 parts of the combined weights of (B) and (C).

7. A novel composition of matter comprising a composition defined in claim 6 converted under acidic conditions to the substantially solid state.

8. A novel composition comprising a novel composition defined in claim 6 together with a filler and an acidic agent in amount sufficient to impart a pH no greater than 3.5 thereto.

9. A novel composition of matter comprising an intimate combination of a novel composition defined in claim 1 together with (A) furfural, the ratio by weight of (A) to the sum of the combined weights of (B) and (C) being 100 parts of (A) to 100–500 parts of the sum of the weights of (B) and (C).

10. A novel composition of matter comprising a composition defined in claim 9 converted under acidic conditions to the substantially solid state.

11. A novel composition comprising a novel composition defined in claim 9 together with a filler and an acidic agent in amount sufficient to impart a pH no greater than 3.5 thereto.

12. A novel composition of matter comprising an intimate combination of (C) furfural-ketone organic reaction products produced by reacting furfural and a ketone having at least two hydrogen atoms on an alpha carbon, and (B) partially hydrogenated monofurfuryl-ketone, said (B) being monofurfuryl-ketone which has had hydrogen combined therewith to an extent at least approximately 15% and no greater than approximately 65% of that necessary to completely saturate with hydrogen all of the carbon to carbon double bonds thereof, the ratio by weight of (B) to (C) being 500 parts of (B) to 50–5000 parts of (C).

13. A novel composition of matter comprising a composition defined in claim 12 converted under acidic conditions to the substantially solid state.

14. A novel combination comprising an intimate combination of (C) furfural-ketone organic reaction product produced by reacting furfural and a ketone having at least two hydrogen atoms on an alpha carbon and (B) partially hydrogenated difurfuryl-ketone, said (B) being difurfuryl-ketone which has had hydrogen combined therewith to an extent at least approximately 15% and no greater than approximately 65% of that necessary to completely saturate with hydrogen all of the carbon to carbon double bonds thereof, the ratio by weight of (B) to (C) being 500 parts of (B) to 50–5000 parts of (C).

15. A novel composition of matter comprising a composition defined in claim 14 converted under acidic conditions to the substantially solid state.

16. A novel composition of matter comprising an intimate combination of (C) furfural-ketone organic reaction product produced by reacting furfural and a ketone having at least two hydrogen atoms on an alpha-carbon, and (B) partially hydrogenated organic reaction mass, said mass before hydrogenation produced by reacting furfural and a ketone having at least two hydrogen atoms on an alpha carbon, said partially hydrogenated mass being said furfural-ketone reaction mass which has had hydrogen combined therewith to an extent at least approximately 15% and no greater than approximately 65% of that necessary to completely saturate with hydrogen all of the carbon to carbon double bonds thereof, the ratio by weight of (B) to (C) being 500 parts of (B) to 50–5000 parts of (C).

17. A novel composition of matter comprising a composition defined in claim 16 converted under acidic conditions to the substantially solid state.

References Cited in the file of this patent

UNITED STATES PATENTS

| | | |
|---|---|---|
| 2,363,829 | Caplan et al. | Nov. 28, 1944 |
| 2,600,403 | Harvey | June 17, 1952 |
| 2,600,764 | Harvey | June 17, 1952 |